C. POTTS.
SYSTEM FOR THE PURIFICATION OF SEWAGE.
APPLICATION FILED JAN. 10, 1910.

955,683.

Patented Apr. 19, 1910.

3 SHEETS—SHEET 1.

Witnesses:

Inventor
Clyde Potts
By his Attorney

C. POTTS.
SYSTEM FOR THE PURIFICATION OF SEWAGE.
APPLICATION FILED JAN. 10, 1910.

955,683.

Patented Apr. 19, 1910.

3 SHEETS—SHEET 2.

Witnesses:
Arthur Marion

Inventor
Clyde Potts
By his Attorney

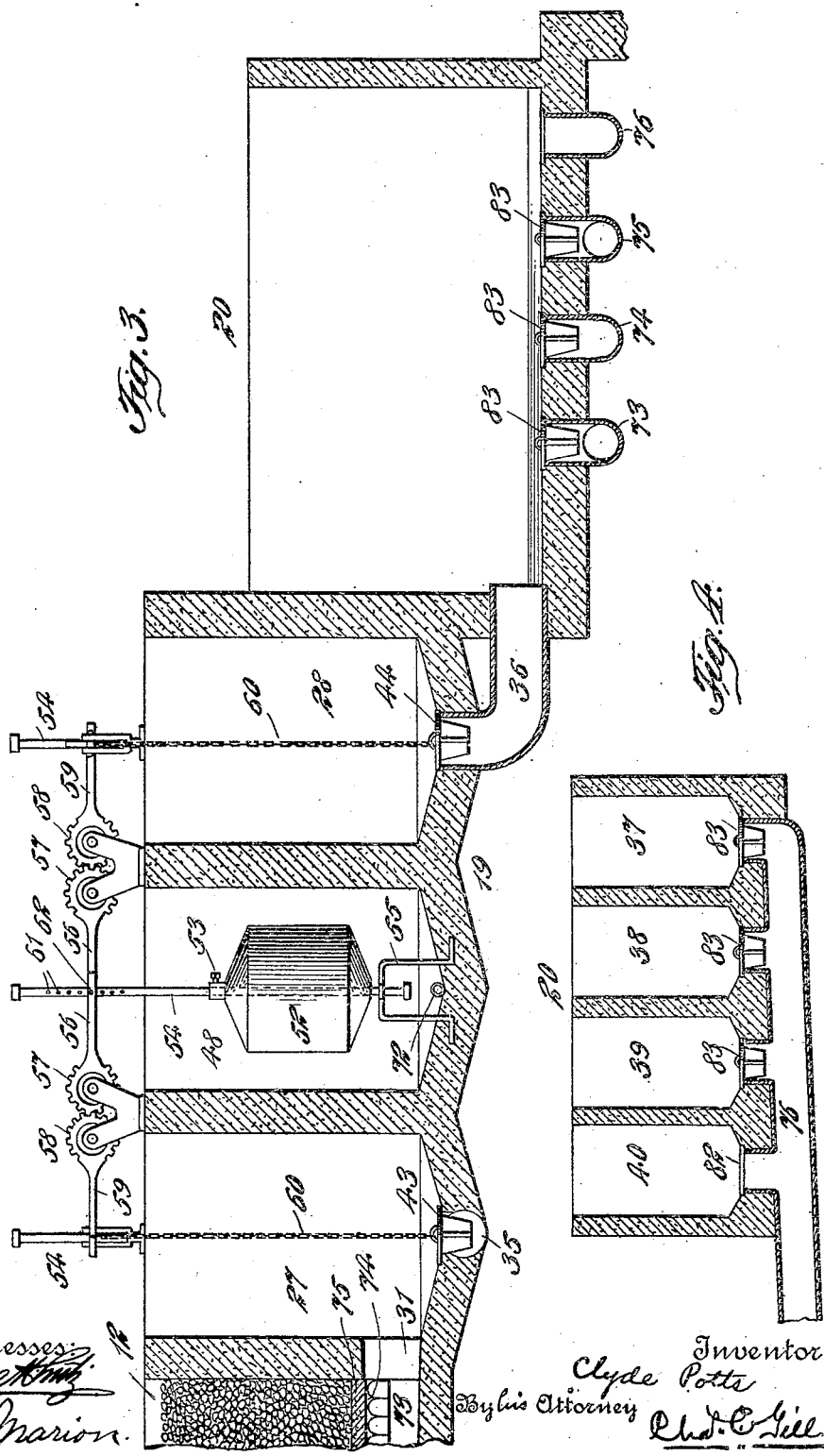

UNITED STATES PATENT OFFICE.

CLYDE POTTS, OF MORRISTOWN, NEW JERSEY.

SYSTEM FOR THE PURIFICATION OF SEWAGE.

955,683.	Specification of Letters Patent.	Patented Apr. 19, 1910.

Application filed January 10, 1910. Serial No. 537,115.

*To all whom it may concern:*

Be it known that I, CLYDE POTTS, a citizen of the United States, and a resident of Morristown, in the county of Morris and State of New Jersey, have invented certain new and useful Improvements in Systems for the Purification of Sewage, of which the following is a specification.

The invention relates to improvements in systems for the purification of sewage, and it consists, more particularly, in the novel apparatus hereinafter described and claimed for automatically emptying and draining, in proper order or series and in proper timing, the contact-beds of one or a primary set and distributing the liquid contents from said beds in proper order to a second set of beds which may be either filter-beds or contact-beds or to a set of basins or reservoirs.

In carrying out my invention I will preferably employ apparatus of the character shown in Letters Patent No. 935,231 granted to me September 28, 1909, for automatically distributing the sewage flowing from the main or sewage tank, to the aforesaid primary contact-beds in the order in which said beds should be filled.

Figure 1:
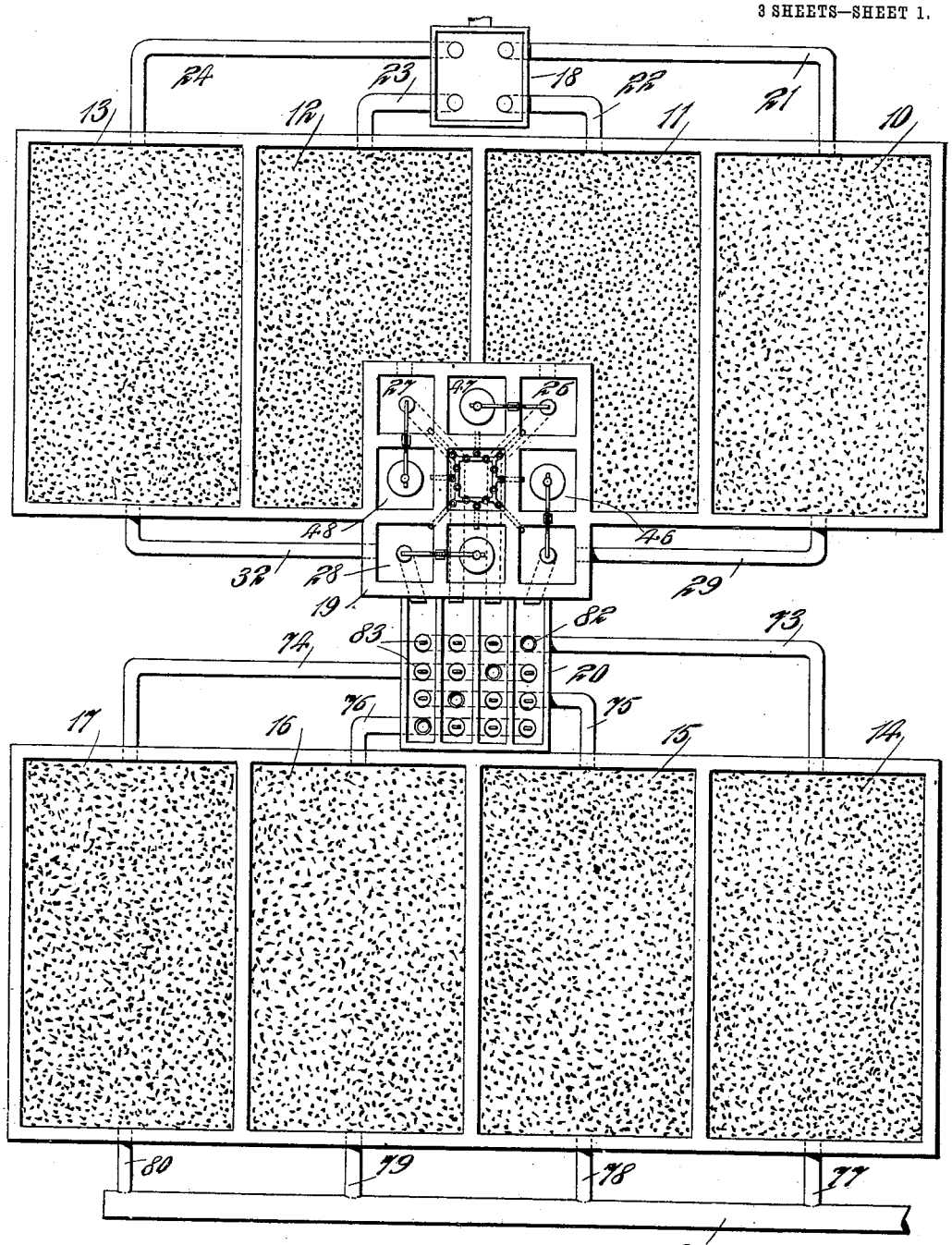
Figure 2:
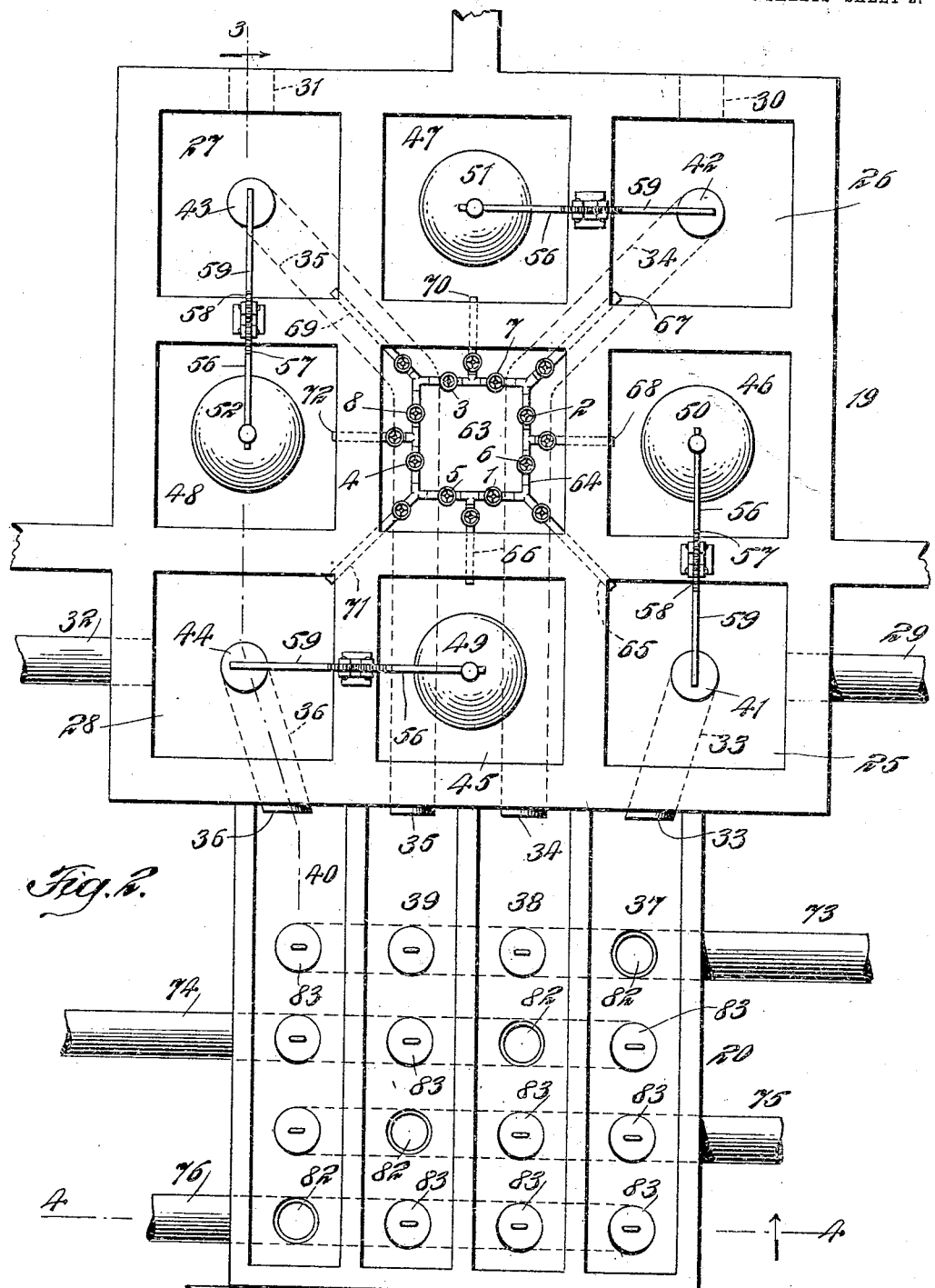

My present invention has to do with the proper and efficient emptying of the contact-beds and the distribution of the liquid therefrom to another set of beds, which as aforesaid may be filter-beds or an additional set of contact beds, and said invention will be fully understood from the detailed description hereinafter presented, reference being had to the accompanying drawings, in which:

Figure 1 is a top or plan view of apparatus embodying my invention, four contact and four filter beds being illustrated, with automatic means for successively emptying the contact-beds and delivering the liquid therefrom to successive filter beds; Fig. 2 is an enlarged top view of a portion of the same and illustrates more clearly than Fig. 1 the means for emptying the contact-beds and directing the flow therefrom to the filter-beds; Fig. 3 is a vertical section on the dotted line 3—3 of Fig. 2; Fig. 4 is a vertical section on the dotted line 4—4 of Fig. 2.

In the drawings 10, 11, 12, 13 denote contact-beds of usual character, and 14, 15, 16, 17 filter-beds which are also of known character.

I diagrammatically indicate at 18 a distributing means, such as shown in detail in my aforesaid patent, for directing the sewage flowing thereto from the septic or other tank, to successive contact-beds. This distributing means may be of varied character and several differently constructed arrangements of apparatus for effecting the distribution of the sewage to the contact-beds are well known.

The liquid from the respective contact-beds flows into the respective chambers of an apparatus designated, as a whole, by the numeral 19, and thence into a distributing apparatus 20, whence it is directed to the appropriate filter-beds.

The distributing apparatus 18 is connected with the respective contact-beds by pipes 21, 22, 23, 24, as usual, and the beds are in succession filled therefrom, the timing of the operation as preferred by me being such that when bed 10 is filling, bed 11 will stand empty (its contents having been discharged and the bed drained), bed 12 will be draining and bed 13 will stand full, and this order of timing will follow continuously in succession or in a cycle through the line of beds, as will be understood from the explanations hereinafter presented.

The apparatus 19 will preferably be a concrete frame-like structure subdivided by vertical partitions into a series of open-top chambers or pits, those numbered respectively, 25, 26, 27, 28, being respectively connected by the pipes or passages 29, 30, 31, 32 with the respective contact-beds 10, 11, 12, 13 and receiving the flow therefrom. The chambers 25, 26, 27, 28 are respectively connected by drain-pipes 33, 34, 35, 36, with the compartments 37, 38, 39, 40 of the apparatus 20, and said pipes are, at the bottoms of said chambers, equipped with independent automatically operated valves 41, 42, 43, 44 for controlling the flow of the liquid thereto.

The chambers 45, 46, 47, 48 of the apparatus 19 contain floats 49, 50, 51, 52 for respectively operating the valves 44, 41, 42 and 43 and thus controlling the flow into the pipes 33, 34, 35, 36. The said floats are adjustably secured, as by set screws 53 (Fig. 3) on vertical rods 54 slidably held at their lower portions in anchored steps or guides 55 and adjustably secured at their upper portions to pivoted arms 56 having at their inner or pivoted ends segments 57 which are in mesh with corresponding segments 58 on the inner ends of pivoted arms 59, whose outer ends have respectively connected to them, by chains 60, the aforesaid valves 41, 42, 43, 44. The upper portion of each rod 54 contains a series of apertures 61 through any of which a pin 62 may be passed in connecting the rod to the arm 56. When a float rises it moves the outer end of its arm 56 upwardly and through the segments 57, 58 turns the outer end of the arm 59 it is to operate, upwardly and thereby opens the valve connected with said arm 59; when the float descends a reverse movement of the arms 56, 59 takes place and said valve closes.

The chamber 63 of the apparatus 19 contains a pipe 64 connected by branch pipes 65, 66, 67, 68, 69, 70, 71, 72 with the respective chambers 25, 45, 26, 46, 27, 47, 28, 48. The said branch pipes each have a valve by which the flow through the same may be controlled or cut off at will, and the main pipe 64 has a valve at each side of each branch pipe, as shown in Fig. 2.

In the usual operation of the apparatus when four contact beds are in use, the flow from bed 10 while the bed is filling will be through pipe 29 into chamber 25 and thence through pipes 65 and 66 into chamber 45 for raising the float 49 therein to open valve 44 in chamber 28 to allow bed 13 to empty and drain; the flow from bed 11 while the same is filling will be through passage 30 into chamber 26 and thence through pipes 67, 68 into chamber 46 for raising float 50 therein to open valve 41 in chamber 25 and thereby allow bed 10 to empty and drain; the flow from bed 12 while the same is filling will be through passage 31 into chamber 27 and thence through pipes 69, 70 into chamber 47 for raising the float 51 therein to open valve 42 in chamber 26 and thereby allow bed 11 to empty and drain, and the flow from bed 13 while the same is filling will be through the pipe 32 into chamber 28 and thence through the pipes 71, 72 into chamber 48 for raising the float 52 therein to open the valve 43 in chamber 27 and thereby allow bed 12 to empty and drain, and following this cycle of operations the use of the system continues, the filling of each contact-bed effecting the emptying at the proper time of the bed last previously filled.

A very desirable feature of the operation of the apparatus 19 is that when a valve (41, 42, 43 or 44) is opened to empty a contact bed it is held open a sufficient length of time for the bed to drain,—this drain being technically designated as the after-drip and of considerable importance. When, for instance, the valve 41 in chamber 25 is opened to empty bed 10, the sewage flowing into said chamber from said bed will all discharge through the pipe 33, but the valve 41 will be held open by the presence of sewage in the chamber 46 supporting the float 50 and will remain open until said chamber 46 drains out through the pipes 68, 67 into chamber 26 and thence into drain-pipe 34, which will happen at the period that bed 11 is emptying, and thereupon valve 41 will close. Chambers 46 and 26 remain full, with valve 41 held open, until the time has arrived for bed 11 to discharge, and thereupon the valve 42 opens and not only empties bed 11 but drains chambers 46, 26 and thereby allows float 50 to descend and valve 41 to close. The valve 41 is by the method just described held open a sufficient length of time for bed 10 to empty and drain, that is get rid of the after drip of the liquid from the contact material, and for the air to circulate into the lower part of the bed and passages leading therefrom.

While contact-bed 10 is discharging through chamber 25 and pipe 33, the sewage which had gathered in chamber 45 during the filling of said bed, will flow back through pipes 66, 65 into said chamber 25 and discharge into drain-pipe 33, thereby allowing valve 44 in chamber 28 to close and leave the bed 13 ready to be refilled.

The filling of bed 12 results in the emptying of bed 11 (the float 51 then raising valve 42), and at this time the flow from the distributing apparatus 18 is diverted to bed 13 and the chamber 47 remains full of sewage to hold the valve 42 open for bed 11 to drain and get rid of the after drip so long as bed 12 and chamber 27 are full. The subsequent filling of bed 13 and chamber 28 and the flow from chamber 28 into chamber 48, results in the valve 43 being opened to empty bed 12, and at this time the sewage in chamber 47 drains into chamber 27 and pipe 35 and the float 51 permits valve 42 to close, thus leaving the empty bed 11 ready to be refilled. The sewage flowing from chamber 28 into chamber 48 remains in said chamber 48, holding valve 43 open, a sufficient length of time for bed 12 to thoroughly drain and until the main flow from the distributer 18 is again diverted into contact-bed 10 and chamber 25, when, by reason of the flow from said chamber 25 through pipes 65, 66 into chamber 45, the float 49 will rise and open the valve 44 to empty chamber 28 and bed 13. At this time the sewage in chamber 48 will flow back through pipes 72, 71 into the chamber 28 and to drain-pipe 36 and the then descending float 52 will permit valve 43 to close, thus leaving bed 12 ready to be refilled. The sewage which during the filling of bed 10 flowed into the chamber 45 to act against the float 49 to open valve 44, will remain in said chamber 45 and hold the valve 44 open so as to permit a thorough drainage of bed 13 until on the opening of valve 41 and the emptying of bed 10 by the filling of bed 11, the sewage in the chamber 45 flows therefrom through pipes 66, 65 to chamber 25 and pipe 33, whereupon the float 49 will descend and permit the valve 44 to close, leaving bed 13 ready to be refilled.

From the foregoing description, it may be seen that the filling of bed 10 and chamber 25 opens the valve 44 for bed 13 and closes the valve 43 for bed 12, that the filling of bed 11 and chamber 26 opens the valve 41 in chamber 25 for bed 10 and closes valve 44 in chamber 28 for bed 13, that the filling of bed 12 and chamber 27 opens the valve 42 for bed 11 and closes the valve 41 for bed 10, and that the filling of bed 13 and chamber 28 opens the valve 43 for bed 12 and closes the valve 42 for bed 11. Thus the filling of one contact bed results in the emptying of another bed and in closing the outlet from a previously emptied and then drained bed so that it may be refilled. One of the contact-beds always remains full until another bed has been filled, and it is during the latter part of the filling of a contact bed that the flow therefrom to the apparatus 19 acts against a float to open a drain or discharge valve.

In the usual operation of the contact beds, distributer 18 and discharge controlling apparatus 19, as may be understood from the foregoing explanation, the condition may constantly exist that one bed, as 10, will be filling, another bed, as 11, will stand empty and drained ready for refilling, another bed, as 12, will be draining, and another bed, as 13, will stand full.

During the operation hereinbefore described, the valves in all the branch pipes 65, 66, 67, 68, 69, 70, 71 and 72 will be open, the valves 1, 2, 3, 4 of the pipe 64 will be open and the valves 5, 6, 7 and 8 of said pipe will be closed.

I may modify the timing of the operation above described and thus vary the general standing condition of the apparatus as a whole, by the manipulation of the valves in the pipe 64. For illustration, if it should be desired to hold the sewage in the contact beds for a longer period or so that the sewage in a bed would remain therein until a definite time after the succeeding bed has been filled, the valves in the branch pipes 65, 66, 67, 68, 69, 70, 71 and 72 or as an equivalent operation the valves 1, 2, 3, 4 in pipe 64, would be throttled to a suitable extent to retard the flow into the float-chambers, thereby delaying the raising of the floats and consequently the opening of the discharge valves 41, 42, 43, 44. The throttling of the flow of sewage into the float-chambers, also results in the retardation of the drain of the sewage therefrom, and hence under this condition the period at which the main discharge valves would remain open would be increased and the drainage period for the beds correspondingly lengthened.

The bottoms of the concrete structures to hold the contact beds should slope downwardly to a gutter, as 73 (Fig. 3), leading to the drain outlets or pipes therefrom, and they may appropriately be grooved, as 74, leading to said gutter. Over the gutter 73 should be placed flagging or flat stone slabs 75 to keep the contact-material from settling down into the same.

The concrete apparatus 20 is an open-top rectangular structure subdivided by partitions into the compartments 37, 38, 39, 40 respectively receiving the flow from the discharge pipes 33, 34, 35, 36 and discharging into the pipes 73, 74, 75, 76 which deliver the liquid to the filter or secondary beds 14, 17, 15 and 16, down through which the liquid will pass and drain therefrom through pipes 77, 80, 78, 79 into a main conduit or drain or the like 81. The pipes 73, 74, 75, 76 extend transversely below all the compartments 37, 38, 39, 40, and all of said compartments have in their bottoms openings 82 leading into all said pipes. The openings 82 or such of them as require the same, are provided with valves 83. In Fig. 2 I have illustrated the compartments 37, 38, 39, 40 as each in communication with one of the pipes 73, 74, 75, 76, but obviously with the arrangement presented all or any of the said compartments may be placed in communication with all or any of said pipes. The liquid from the contact-beds may thus be directed to the filter-beds in any order or manner desired, and whenever desired one or more of the filter-beds may be cut out of the system.

I do not confine the apparatus 19 to the employment therewith of four contact beds and four floats. The valves in the pipe 64 and its branches may be manipulated to cut out of the system any one or more of the contact-beds, one float and its chamber being cut out for each contact-bed placed out of use. The more efficient operation ensues when a plurality of contact-beds are employed and the apparatus 19 is used in the manner hereinbefore described, but said apparatus 19 is capable of being so used that one valve chamber (as 25) and one float chamber (as 46) with its float may be independently employed for each bed. If, for illustration, it should be desired to use bed 10 with the chambers 25, 46, exclusively, I would open valve 6 and close valves 1, 2 in pipe 64 and allow the flow into chamber 25 from bed 10 to pass through the restricted opening furnished by the pipes into chamber 46, and I would also probably adjust the float 50 upwardly so as to retard its upward movement, and under this condition the flow from bed 10 into chamber 25 would continue until said bed was full and sufficient sewage had passed into chamber 46 to raise the float 50 and open valve 41 to empty bed 10. The drainage from chamber 46 back into chamber 25 would be slow, being through a restricted passage and one which may be restricted by a valve (as 6) as much as may be desired, and hence the closing of valve 41 may be delayed to permit bed 10 to thoroughly drain.

What I claim as my invention and desire to secure by Letters Patent, is:

1. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve-chamber of another bed and containing a float operatively connected with said valve for opening it to effect the discharge from its bed when said float rises due to the flow into and from said second bed while the same is being filled, whereby the filling of one bed effects the emptying of another bed and the holding of the discharge valve open until said one bed is emptied; substantially as set forth.

2. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve-chamber of another bed and containing a float operatively connected with said valve for opening it to effect the discharge from its bed when said float rises due to the flow into and from said second bed while the same is being filled, whereby the filling of one bed effects the emptying of another bed and the holding of its discharge valve open until said one bed is emptied, the communication from said valve chamber of another bed to said float chamber being by means of a pipe having a valve whereby the flow to and from said float chamber may be varied in accordance with the timing desired for the operation of the discharge valves; substantially as set forth.

3. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve-chamber of another bed and containing a float operatively connected with said valve for opening it to effect the discharge from its bed when said float rises due to the flow into and from said second bed while the same is being filled, whereby the filling of one bed effects the emptying of another bed and the holding of its discharge valve open until said one bed is emptied, the means operatively connecting a discharge valve with its float comprising a pivoted arm connected with the float and having gear-teeth at its pivoted end and a pivoted arm connected with the valve and having gear-teeth at its pivoted end in mesh with the gear-teeth of the float arm; substantially as set forth.

4. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve chamber of another bed and containing a float operatively connected with said valve for opening it to effect the discharge from its bed when said float rises due to the flow into and from said second bed while the same is being filled, whereby the filling of one bed effects the emptying of another bed and the holding of its discharge valve open until said one bed is emptied, combined with a series of secondary beds, and a distributing apparatus between said discharge controlling apparatus and said secondary beds for receiving the flow therefrom and directing the same to the respective secondary beds; substantially as set forth.

5. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve-chamber of another bed and containing a float operatively connected with said valve for opening it to effect the discharge from its bed when said float rises due to the flow into and from said second bed while the same is being filled, whereby the filling of one bed effects the emptying of another bed and the holding of its discharge valve open until said one bed is emptied, combined with a series of secondary beds, and a distributing apparatus between said discharge controlling apparatus and said secondary beds for receiving the flow therefrom and directing the same to the respective secondary beds, said distributing apparatus comprising a series of compartments each connected with one of said discharge outlets and having a pipe leading therefrom to one of said secondary beds; substantially as set forth.

6. In a system for the purification of sewage employing contact-beds and means for successively filling them, a discharge controlling apparatus for said beds comprising for each bed a chamber connected with the bed and having a valve and a discharge outlet controlled thereby and a chamber in communication with the valve-chamber of another bed and containing a float operatively connected with said valve for opening it to effect the discharge from its bed when said float rises due to the flow into and from said second bed while the same is being filled, whereby the filling of one bed effects the emptying of another bed and the holding of its discharge valve open until said one bed is emptied, combined with a series of secondary beds, and a distributing apparatus between said discharge controlling apparatus and said secondary beds for receiving the flow therefrom and directing the same to the respective secondary beds, said distributing apparatus comprising a series of compartments each connected with one of said discharge outlets and discharge pipes leading from said compartments to said secondary beds, each of said pipes extending transversely of all of said compartments and provided with means for discharging any or all thereof; substantially as set forth.

7. In a system for the purification of sewage employing contact-beds and means for successively filling them, a discharge controlling apparatus for said beds comprising for each bed a chamber connected with the bed and having a main discharge outlet and a valve controlling the same, a chamber containing a float operatively connected with said valve, and means for placing said chambers in restricted communication with each other; substantially as set forth.

8. In a system for the purification of sewage, a contact bed and means for controlling the discharge therefrom comprising a chamber connected with the bed and having a main discharge outlet and a valve therefor, a chamber containing a float operatively connected with said valve, and means for placing said chambers in restricted communication with each other; substantially as set forth.

9. In a system for the purification of sewage, a contact bed and means for controlling the discharge therefrom comprising a chamber connected with the bed and having a main discharge outlet and a valve therefor, a chamber containing a float operatively connected with said valve, and means for placing said chambers in restricted communication with each other, the means connecting the float and valve comprising two pivoted arms geared together, one being connected with the float and the other with said valve; substantially as set forth.

10. In a system for the purification of sewage employing contact-beds and means for successively filling them, a discharge controlling apparatus for said beds comprising a structure having chambers 25, 26, 27, 28 respectively in communication with said beds and provided with main discharge outlets and valves therefor, and chambers 45, 46, 47, 48 respectively in restricted communication with said chambers 25, 26, 27, 28 and containing floats respectively operatively connected with said valves; substantially as set forth.

11. In a system for the purification of sewage employing contact-beds and means for successively filling them, a discharge controlling apparatus for said beds comprising a structure having chambers 25, 26, 27, 28 respectively in communication with said beds and provided with main discharge outlets and valves therefor, and chambers 45, 46, 47, 48 respectively in restricted communication with said chambers 25, 26, 27, 28 and containing floats respectively operatively connected with said valves, the means placing said sets of chambers in communication comprising a main pipe 64 having valved branches leading to said chambers and provided with a valve at each side of each of said branches; substantially as set forth.

12. In a system for the purification of sewage employing contact-beds and secondary beds, a distributing apparatus receiving the discharge from the contact-beds and delivering the same to said secondary beds and comprising a series of compartments each connected to receive the discharge of one of said contact beds and discharge pipes leading from said compartments to said secondary beds, each of said pipes extending transversely of all of said compartments and provided with means for discharging any or all thereof; substantially as set forth.

Signed at New York city, in the county of New York and State of New York, this 8th day of January A. D. 1910.

CLYDE POTTS.

Witnesses:
 ARTHUR MARION,
 CHAS. C. GILL.